United States Patent
Bhutada et al.

(10) Patent No.: US 11,163,659 B2
(45) Date of Patent: Nov. 2, 2021

(54) ENHANCED SERIAL PERIPHERAL INTERFACE (ESPI) SIGNALING FOR CRASH EVENT NOTIFICATION

(71) Applicant: Intel Corporation, Santa Clara, CA (US)

(72) Inventors: Aditya Bhutada, Beaverton, OR (US); Zhenyu Zhu, Folsom, CA (US); Mazen Gedeon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 16/394,929

(22) Filed: Apr. 25, 2019

(65) Prior Publication Data

US 2019/0251010 A1 Aug. 15, 2019

(51) Int. Cl.
*G06F 11/22* (2006.01)
*G06F 11/07* (2006.01)

(52) U.S. Cl.
CPC ...... *G06F 11/2221* (2013.01); *G06F 11/0772* (2013.01); *G06F 11/0778* (2013.01); *G06F 11/0784* (2013.01)

(58) Field of Classification Search
CPC ............ G06F 11/0772; G06F 11/0778; G06F 11/0784; G06F 11/0787; G06F 11/0766
See application file for complete search history.

(56) References Cited

U.S. PATENT DOCUMENTS

| | | | | |
|---|---|---|---|---|
| 2008/0126852 A1* | 5/2008 | Brandyberry | ....... | G06F 11/0745 714/6.13 |
| 2010/0235688 A1* | 9/2010 | Bennah | ............... | G06F 11/0706 714/57 |
| 2011/0307746 A1* | 12/2011 | Sullivan | .................. | G06F 1/181 714/57 |
| 2013/0166953 A1* | 6/2013 | Tanaka | .................. | G06F 11/079 714/25 |
| 2015/0006962 A1* | 1/2015 | Swanson | ............. | G06F 11/0724 714/38.11 |
| 2018/0365147 A1* | 12/2018 | Fevrier | ............... | G06F 12/0868 |
| 2019/0042348 A1* | 2/2019 | Krithivas | ............ | G06F 11/0721 |
| 2019/0243701 A1* | 8/2019 | Kurts | .................. | G06F 11/0778 |

OTHER PUBLICATIONS

Intel Corporation. Enhanced Serial Peripheral Interface (eSPI) Interface Base Specification Revision 1.0, [retrieved on Dec. 10, 2020], Retrieved from the internet: <URL:https://www.intel.com/content/dam/support/us/en/documents/software/chipset-software/327432-004_espi_base_specification_rev1.0_cb.pdf> (Year: 2016).*

* cited by examiner

*Primary Examiner* — Bryce P Bonzo
*Assistant Examiner* — Albert Li
(74) *Attorney, Agent, or Firm* — Schwabe, Williamson & Wyatt, P.C.

(57) ABSTRACT

Embodiments may include apparatus, systems, and methods associated with an Enhanced Serial Peripheral Interface (eSPI) channel interface to couple to a data bus to link an eSPI primary device to an eSPI secondary device. In embodiments, the eSPI primary device includes an eSPI device controller and is coupled to the channel interface and transmits a notification of a crash event, e.g., a catastrophic error (CATERR), via packet-based signaling, such as a virtual wire (VW) over the data bus to allow the eSPI primary device to transmit the notification of the crash event without allocation of a dedicated wire signal for the notification between the eSPI primary device and the eSPI secondary device. Other embodiments may be described and/or claimed.

18 Claims, 6 Drawing Sheets

ENHANCED SERIAL PERIPHERAL INTERFACE (ESPI) SIGNALING FOR CRASH EVENT NOTIFICATION

TECHNICAL FIELD

The present disclosure relates to the field of computing. More particularly, the present disclosure relates to an Enhanced Serial Peripheral Interface (eSPI) method and/or protocol, apparatus, and system, for signaling of catastrophic error notification via packet-based signaling.

BACKGROUND

The background description provided herein is for purpose of generally presenting the context of the disclosure. Unless otherwise indicated herein, the materials described in this section are not prior art to the claims in this application and are not admitted to be prior art by inclusion in this section.

The Enhanced Serial Peripheral Interface (eSPI) is a bus interface for both client and server platforms that was developed in part to reduce the number of pins required on motherboards compared to the Low Pin Count (LPC) bus. The LPC bus is a legacy bus developed as the replacement for Industry Standard Architecture (ISA) bus. Most personal computer (PC) motherboards with an LPC bus have either a Platform Controller Hub (PCH) or a southbridge chip, which acts as the host and controls the LPC bus. Other devices connected to the physical wires of the LPC bus may be peripherals. The devices that can be supported over the eSPI interface include but are not necessarily limited to Embedded Controller (EC), Baseboard Management Controller (BMC), Super-I/O (SIO) and Port-80 debug card. The eSPI Base specification, revision 1.0, defines certain virtual wires (VWs) between an eSPI primary device (eSPI Base specification, revision 1.0 refers to this term as "master") (e.g., PCH) & secondary device (eSPI Base specification, revision 1.0 refers to this term as "slave") e.g., EC or BMC.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
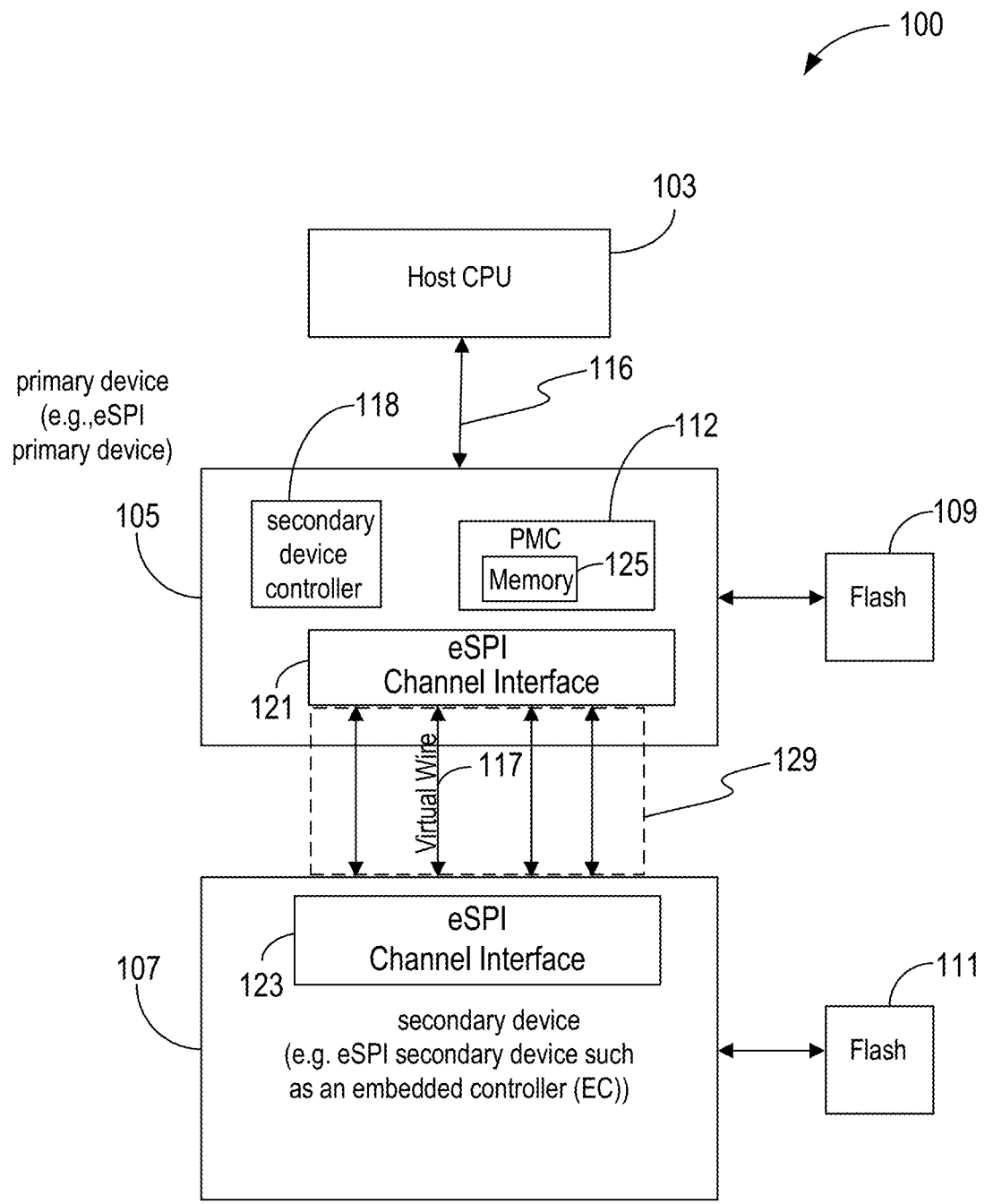
FIG. 1 illustrates an overview of an example communications environment including primary and secondary devices having the Enhanced Serial Peripheral Interface (eSPI) technology of the present disclosure, in accordance with various embodiments.

When a crash event in a computing system occurs, such as, for example, a catastrophic event or catastrophic error (CATERR), crash log data may be collected for later analysis. In many platform architectures, it is important that certain devices, e.g., one or more secondary devices, are notified in order to retrieve the crash event information prior to a central processing unit (CPU) reset. Once the device is notified, it may retrieve or store a crash log report, prior to a reset operation of the CPU or a host platform interface device (e.g., chipset such as a platform controller hub (PCH)). Physical signal routing of a CATERR signal, however, from the CPU or the PCH to a secondary device (e.g., an embedded controller (EC)) would be prohibitively expensive, requiring an extra pin allocation on the EC and a voltage level translator.

Accordingly, apparatuses, methods and storage medium associated with provision and operation of primary and secondary devices, e.g., eSPI primary and eSPI secondary devices, to transmit and/or receive a notification of a crash event (e.g., a catastrophic error (CATERR)) via packet-based signaling such as, e.g., virtual wire (VW), are disclosed herein. In some embodiments, an eSPI primary device (also referred to as "primary device") and eSPI secondary device (also referred to as "secondary device") includes an eSPI channel interface to couple to a data bus to link an eSPI primary device to an eSPI secondary device. In embodiments, the eSPI primary or eSPI secondary device includes an eSPI device controller to transmit or receive a notification of a crash event via packet-based signaling, such as VW over the data bus, to allow the eSPI primary device or the eSPI secondary device to transmit or receive the notification of the crash event without allocation of a dedicated wire signal for the notification between the eSPI primary device and the eSPI secondary device.

In embodiments, an eSPI primary device component further detects and stores a crash log report of the crash event and in response to a request from the eSPI secondary device, retrieves the crash log report and provides the crash log report via a message, e.g., an out of band (OOB) message or multiple OOB messages and/or transactions to the eSPI secondary device. In embodiments, multiple OOB messages and/or transactions are provided until a complete or substantially complete crash log is transmitted. In embodiments, after the crash log report is provided to the eSPI secondary device, the eSPI primary device may implement a reset command to recover a previous state of the eSPI secondary device, the eSPI primary device, and/or CPU. As a result, in some embodiments, crash log data is recovered, and a CPU, chipset, or other device associated with the crash event may be reset without loss of the crash log data.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an example communications environment 100 including the Enhanced Serial Peripheral Interface (eSPI) technology of the present disclosure, in accordance with various embodiments is illustrated. As shown, for the illustrated embodiments, communications environment 100 includes a host CPU 103 ("CPU 103"), a primary device 105 (e.g., an eSPI primary device), secondary device 107 (e.g., an eSPI secondary device), and additional secondary devices (e.g., non-eSPI secondary devices, such as flash 109 and flash 111), coupled to each other as shown. In embodiments, primary device 105 may be a host chipset, e.g., a platform controller hub (PCH) or other platform controller interface device to provide various support or communications functions between one or more secondary devices and a host CPU coupled to primary device 105.

In embodiments, primary device 105 and secondary device 107 include respective eSPI channel interfaces 121 and 123 coupled via a data bus 129 (e.g., an eSPI data bus or channel) to link primary device 105 device to secondary device 107. In embodiments, primary device 105 includes a secondary device controller 118 (e.g., eSPI secondary device controller) coupled to eSPI channel interface 121 to control transmission of a notification of a crash event via packet-based signaling over data bus 129, to allow master device 105 or secondary device 107 to transmit or receive the notification of the crash event without allocation of a dedicated wire signal for the notification between primary 105 device and secondary device 107. In embodiments, the packet-based signaling comprises a Virtual Wire (VW) 117 to transmit the notification of the crash event to the secondary device over an eSPI data bus. Note that although VW 117 is shown in FIG. 1 as corresponding to a particular wire or link, VW 117 can be associated with any of the wires or links of data bus 129. In embodiments, the crash event includes a catastrophic error (CATERR) on or associated with host CPU 103 coupled to primary device 105 or a CATERR on or associated with eSPI primary device 105. As shown, host CPU 103 is coupled to primary device 105 through a high speed link 116, e.g., a direct media interface (DMI).

In embodiments, primary device 105 includes a primary device component 112, such as a power management controller (PMC), to detect and store a crash log report of the crash event. In some embodiments, primary device component 112, may include a memory 125 such as a static random-access memory (SRAM) to store the crash log report or data associated with the crash event or CATERR. In other embodiments, primary device component 112 may store the crash log report on other memory on primary device 105 or on flash 109. In embodiments, as will be discussed below with respect to FIG. 2, primary device component 112, is to, in response to a request from secondary device 107, retrieve the crash log report from memory 125 or other memory and provide the crash log report via a message, e.g., an out of band (OOB) message, to secondary device 107. Furthermore, in embodiments, after the crash log report is provided to the eSPI secondary device, primary device 105 is to implement a reset command to recover a previous state of secondary device 107, primary device 105, and/or CPU.

In some examples, secondary device 107 is an eSPI secondary device such as an embedded controller (EC). In embodiments, the EC includes a microcontroller with input/output (I/O) and internal features to address particular low power or other needs of host CPU 103 and is coupled eSPI or non-eSPI secondary devices, e.g., flash 111. Note that in various embodiments, secondary device 107 may include any suitable eSPI secondary device that may transmit or receive a CATERR notification or related information or data. For example, in various embodiments, secondary device 107 includes one or more of an eSPI secondary device such as a baseboard management controller (BMC) or a super input/output (SIO) controller. In various embodiments, an eSPI secondary device transmits or receives a CATERR notification or related information. In some embodiments, the eSPI secondary device receives a CATERR notification because its various functions may be affected by or related to an impending CPU reset.

Note that in embodiments, secondary device controller 118 of primary device 105 is coupled to eSPI channel interface 121 and is configured to handle transmission of communications via VW to/from selected eSPI secondary device 107 or other eSPI secondary devices. In particular, secondary device controller 118 is configured to handle physical layer communications to and from eSPI secondary device(s) to enumerate one or more eSPI secondary devices similar to eSPI secondary device 107, assign addresses to eSPI secondary device, establish communication pipes (logical channels) with function endpoints of eSPI devices, exchange communications over the pipes, and so forth. In embodiments, secondary device controller 118 is an eSPI device controller configured to handle physical layer communications to and from eSPI devices, in accordance with Enhanced Serial Peripheral Interface (eSPI) Specification 1.x (i.e., 0.4 initially released February 2012, or 1.0 released January 2016)) and future revised versions).

These and other aspects of the eSPI technology for notification of a crash event in a communications environment will be further described below with additional references to FIG. 1 and references to remaining FIGS. 2-5 below.

Figure 2:
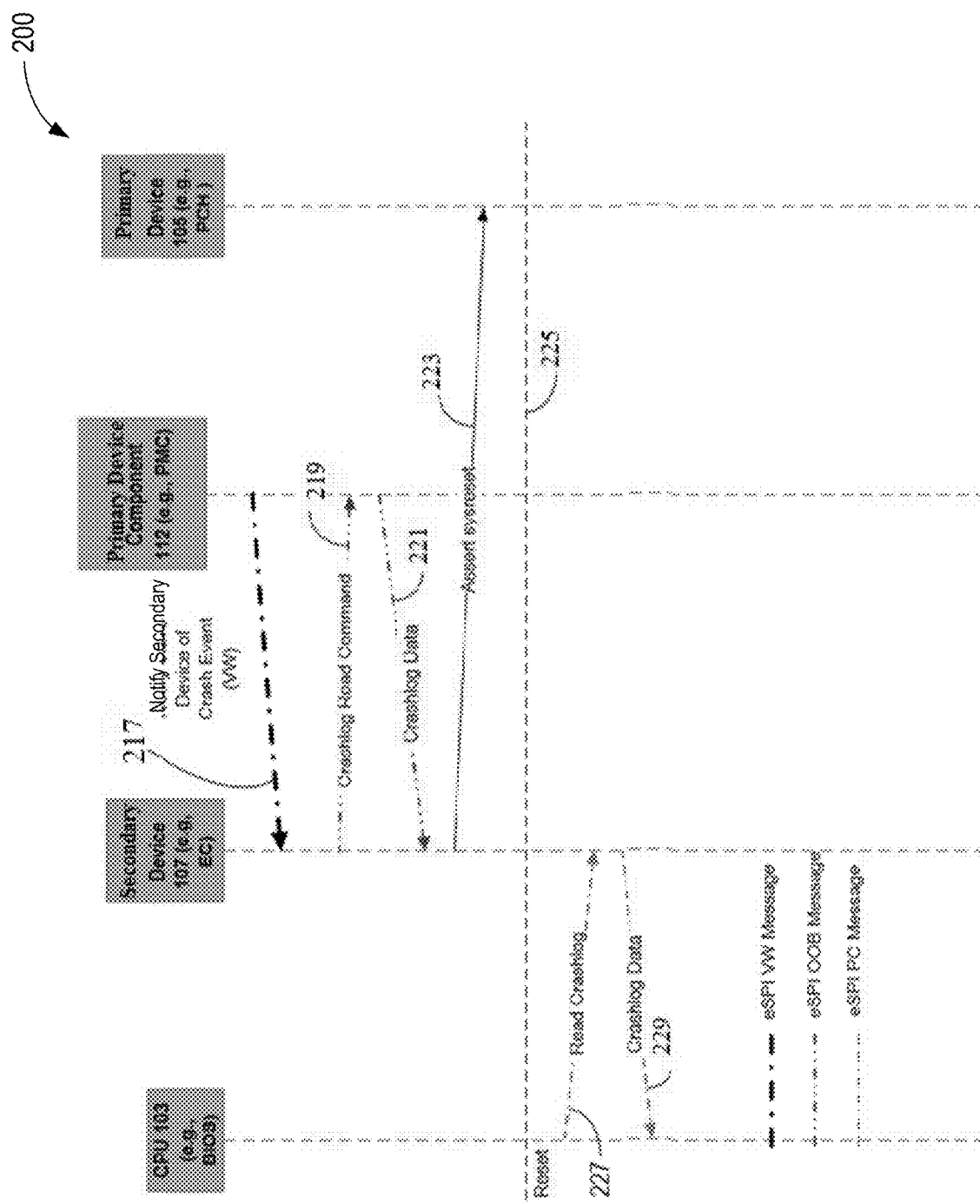
FIG. 2 illustrates an example process for notification of a crash event via eSPI packet-based signaling, according to various embodiments.

FIG. 2 illustrates an example eSPI process 200 and/or protocol for notification of a crash event via packet-based signaling, e.g., a virtual wire (VW) such as VW 117 of FIG. 1, according to various embodiments. As shown at the top of FIG. 2, the operations may be performed by an example host CPU 103, a secondary device 107, a primary device component 112, and a primary device 105. In embodiments, a basic input/output system (BIOS) may perform the operations associated with host CPU 103. Note that in embodiments, host CPU 103, primary device component 112, secondary device 107, and primary device 105 may be similar to or the same as corresponding elements as introduced above in FIG. 1.

In embodiments, primary device component 112 (such as, e.g., a PMC) detects a crash event and stores a crash log and/or related information to the crash event (e.g., memory 125 of FIG. 1, e.g., SRAM or other suitable memory associated with e.g., a PMC). At arrow 217, primary device component 112 (PMC) transmits notification of the crash event via packet-based signaling, e.g., via a virtual wire (e.g., VW 117), over an eSPI data bus or channel (e.g., a bus 129 of FIG. 1). In embodiments, the crash event is a CATERR associated with CPU 103 and/or one or more devices on primary device 105 (as described above in connection with FIG. 1, primary device 105 may include, for example, a PCH or other platform controller interface device that supports communications and other operations between a CPU and peripheral and other coupled devices). In embodiments, transmitting notification of the crash event via VW 117 allows primary device 105 to communicate the crash event to secondary device 107 without allocation of a dedicated wire signal for the notification between primary device 105 and secondary device 107. In response, once notified of the crash event, secondary device 107 sends a crash log read command at 219 to primary device component 112.

Next, in embodiments, primary device component 112 retrieves crash log data or other data associated with the crash event or CATERR from the memory. As noted above, primary device component 112 (e.g., PMC) has already stored the crash log or related information in memory 125 so that it is available in a buffer to send to secondary device 107 (e.g., EC) in e.g., 64-byte chunks. Accordingly, in the embodiment shown in the Figure, primary device component 112 then responds to the crash log read command and provides the crash log or crash log data to secondary device 107, as indicated by arrow 221. In embodiments, the crash log read command as well as the crash log or crash log data is sent via one or more out of band (OOB) message on data bus 129. Note that in some embodiments, the OOB messages are eSPI messages and include eSPI OOB messages defined in an eSPI Specification, e.g., eSPI Specification Version 1.0 released January 2016 and/or future revision of the same.

Next in embodiments, after secondary device 107 has received the crash log data, it sends a message to primary device 105 asserting a system reset or similar command at 223 to indicate that primary device 107 is to execute a system reset (in embodiments, primary device 107 may in turn, notify CPU 103 that CPU 103 may be execute the system reset). Accordingly, as indicated by dotted line 225, CPU 103 resets to recover a previous state of CPU 103. In embodiments, CPU 103 then transmits an eSPI peripheral channel (PC) message at arrow 227 including, e.g., a command to read the crash log ("Read Crash Log command") to secondary device 107. In response, as shown at next arrow 229, secondary device 107 provides the crash log data to host CPU 103 via the eSPI PC message. In embodiments, the crash log data is stored by the CPU 103 for creation of an error report for analysis of causes of the crash or CATERR.

Note that primary device component 112 includes any suitable component of the primary device (e.g., of primary device 105) that can perform operations similar to, e.g., example PMC of FIG. 1, and is coupled to, e.g., an eSPI channel interface and/or an eSPI data bus 129 to transmit a notification of the crash event over a VW 117.

Figure 3:
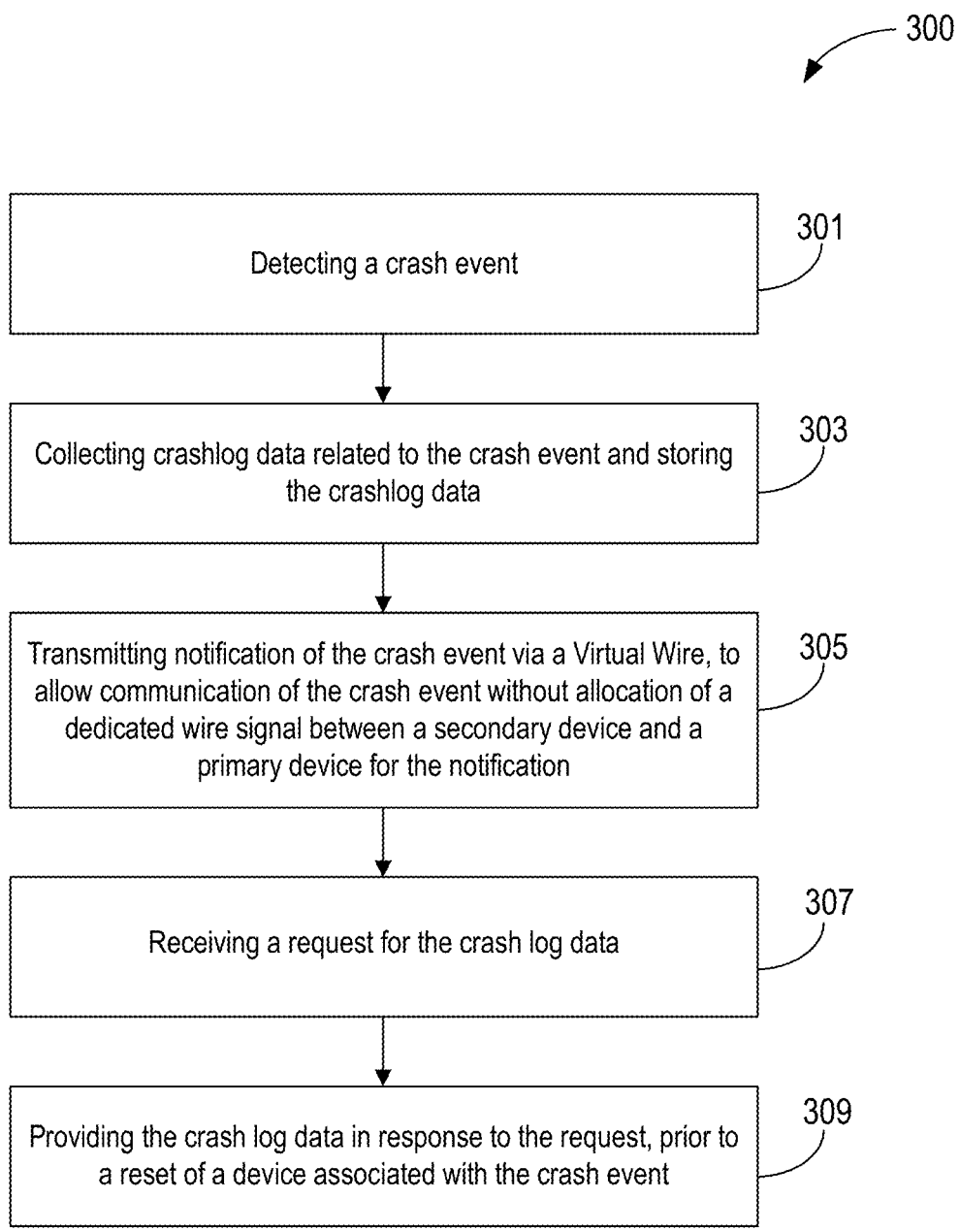
FIG. 3 is a flow diagram of an example method performed by a primary eSPI device associated with the embodiments of FIG. 2, according to various embodiments.

Next, FIG. 3 is a flow diagram of an example method 300 performed by a primary device associated with the embodiments of FIGS. 2 and 3, according to various embodiments. In embodiments, method 300 is performed by, e.g., a primary device component 112 (e.g., PMC) of primary device 105 of FIG. 1. In other embodiments, method 300 may include more or less operations, or some of the operations may be performed in different order.

Method 300 starts at block 301. At block 301, a crash event is detected. In embodiments, the crash event includes, e.g., a catastrophic error (CATERR) of a host central processing unit (CPU), e.g., host CPU 103 coupled to the primary device or other CATERR or crash event associated with a primary device, e.g., primary device 101. Note that in embodiments, the primary device includes a platform controller interface, e.g., platform controller hub (PCH). In embodiments the crash event is associated with any device on or coupled to the PCH. In embodiments, devices associated with the PCH and coupled to various peripheral and other devices may include, e.g., controllers for DRAM, a controller for multiple graphics displays, USB interfaces, SATA controllers for disk drives and other storage media, an Ethernet LAN port, high definition media, and the like, through which the PCH receives crash log data via, e.g., an on-chip system fabric-sideband (e.g., IOSF-SB).

Next, at block 303, method 300 includes collecting crash log data related to the crash event and storing the crash log data. In embodiments, the crash log data is collected from the CPU or a device associated with the primary device and stored in a memory associated with, e.g., a PMC. In an example embodiments, a PMC collects CPU and PCH crash log data from any of, e.g., the devices noted above and/or that are associated with an IOSF-SB.

At block 305, in embodiments, method 300 includes transmitting notification of the crash event via packet-based signaling, e.g., VW 117 or 217 of FIGS. 1 and 2, to allow communication of the crash event without allocation of a dedicated wire signal between a secondary device and a primary device for the notification. In embodiments, transmitting the notification of the crash event comprises transmitting a notification of a CATERR to an EC or other eSPI secondary device, prior to a reset of a CPU coupled to the eSPI primary device or a reset of the eSPI primary device In embodiments, at a block 307, method 300 includes receiving a request for the crash log data from, e.g., secondary device 107. In embodiments, as described above in connection with FIG. 3, the message is an eSPI OOB message. In various embodiments, the message may include an in-band or OOB message to be transmitted on eSPI data bus 115.

At a next block 309, embodiments include providing the crash log data in response to the request, prior to a reset of a device associated with the crash event. In embodiments, method 300 includes to, in response to the request, retrieve the crash log report from memory, e.g., memory 125 of FIG.

1, and provide the crash log report via an OOB message to the requesting device, e.g., secondary device 107.

Note that in other embodiments, any suitable component of the primary device that can perform operations similar to example primary device component (PMC) of FIG. 1, and is coupled to, e.g., an eSPI channel interface and/or an eSPI data bus (e.g., data bus 129) to transmit a notification of the crash event over a VW, is contemplated to perform the above method.

Figure 4:
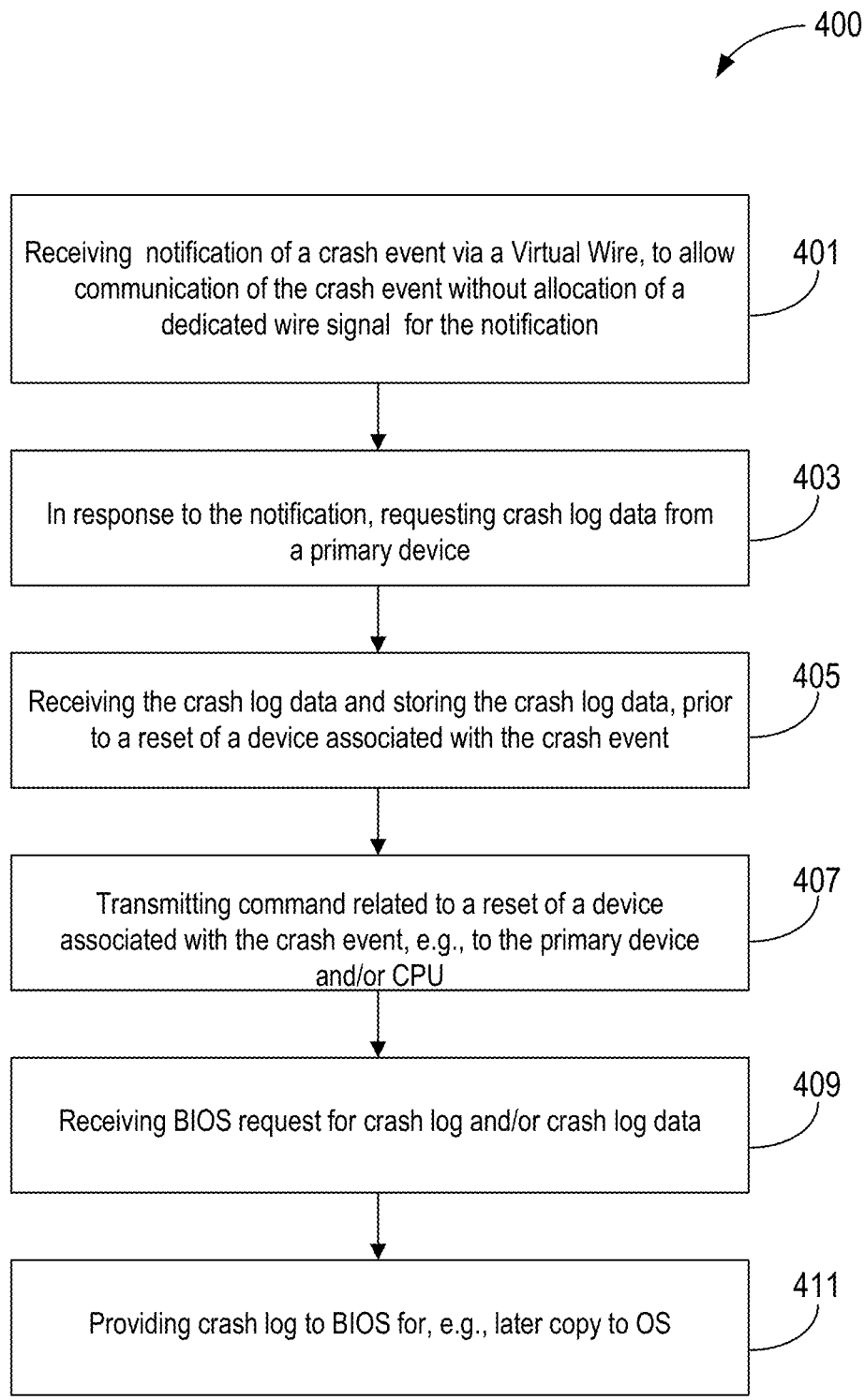
FIG. 4 is a flow diagram of an example method performed by a secondary eSPI device associated with the embodiments of FIGS. 2 and 3, according to various embodiments.

Referring now to FIG. 4, which is a flow diagram of an example method 400 performed by a secondary device 107, e.g., an eSPI secondary device, according to various embodiments. In the example embodiments discussed, secondary device 107 is an EC. In various embodiments, however, secondary device 107 includes one or more other suitable eSPI secondary devices that can perform similar functions to an EC and includes a suitable channel interface, e.g., eSPI channel interface 123 of FIG. 1, to receive a notification of the crash event via a VW. In other embodiments, method 400 may include more or less operations, or some of the operations may be performed in different order.

Method 400 starts at block 401. At block 401, the method includes receiving notification of a crash event via a VW instead of a signal wire from primary device 105 of FIGS. 1 and 2. In embodiments, the notification via the VW allows communication of the crash event without allocation on primary device 105 and secondary device 107 of a dedicated wire signal for the notification. For example, in embodiments, the communication via VW does not require an extra pin allocation on the EC and a voltage level translator.

At a next block 403, in response to the notification, the method includes requesting crash log data from the primary device. In embodiments, the request for crash log data includes an eSPI OOB message as described in connection with FIG. 2, however, in other embodiments includes any suitable type of message, including a VW. In embodiments, crash log data includes any record of transactions leading to a crash or failure of a device and which is later used to discover a hardware or software source of the crash event or failure.

At block 405, the method includes receiving the crash log data and storing the crash log data, prior to a reset of a device associated with the crash event. In embodiments, the crash log data is stored prior to a reset of a CPU, e.g., CPU 103 or the primary device, e.g., primary device 105. In embodiments, the crash log data is stored by e.g., the EC in a memory of the EC or in some embodiments, in flash memory 111 of FIG. 1.

In embodiments, at block 407, the method includes transmitting a system reset or similar command related to a reset of the primary device (e.g., see 223 of FIG. 2). In some embodiments, CPU 103 may implement a reset command to recover a previous state of CPU 103 (e.g., as discussed with respect to 223 of FIG. 2). In embodiments, the CPU 103 may implement the reset command without losing crash log data, which is now stored by the secondary device.

At a block 409, in embodiments, the method includes receiving a BIOS request for crash log and/or crash log data. In response, at block 411, in embodiments, secondary device 107 provides the crash log and/or crash log data to the BIOS for later copy to the operating system (OS).

In embodiments, the crash log data may be provided via one or more messages over an existing eSPI channel. In embodiments, the crash log data is stored by the CPU 103 for preparation of an error report and analysis of causes of the crash or CATERR.

Figure 5:
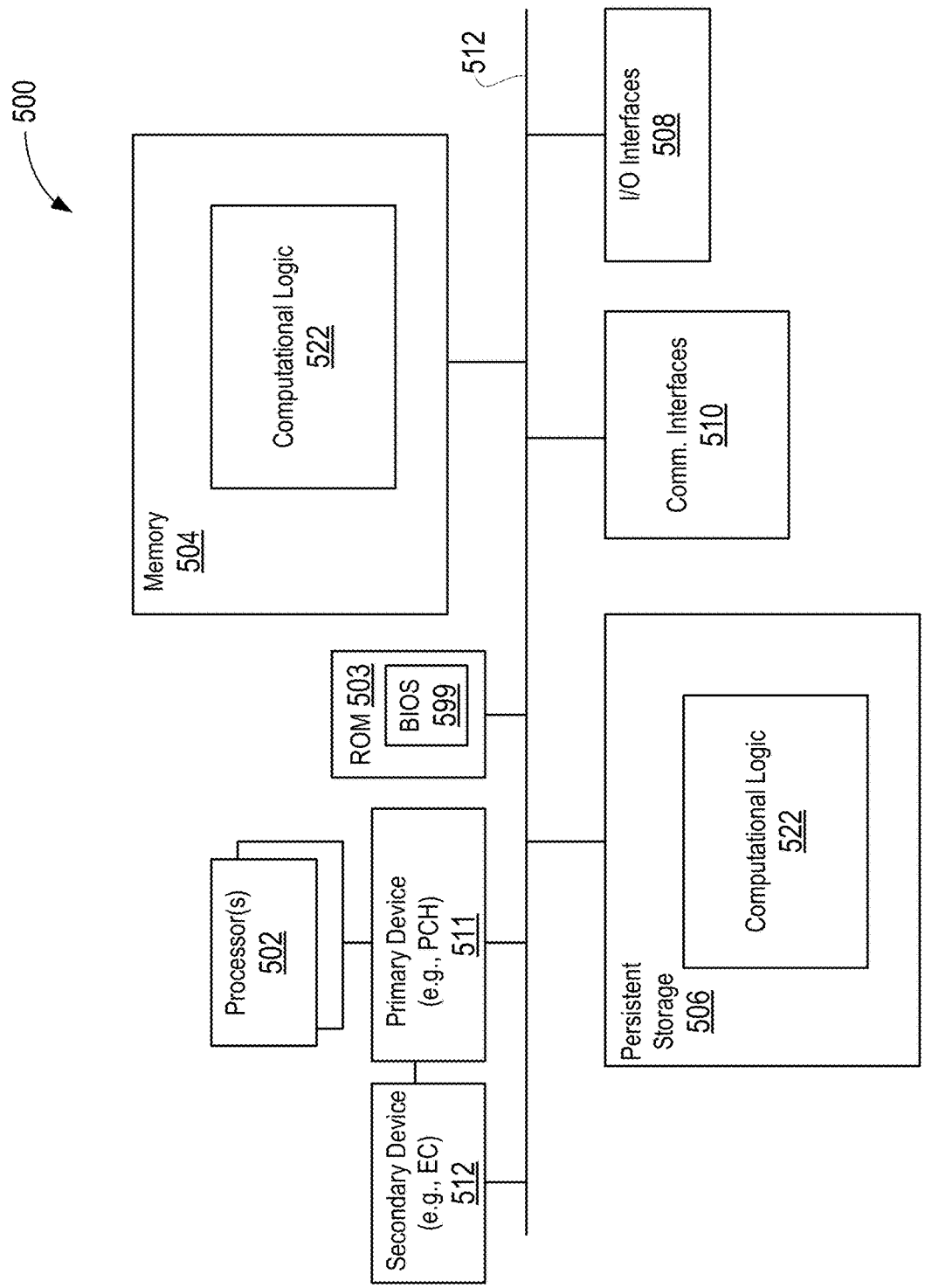
FIG. 5 illustrates an example computing device having the eSPI technology of the present disclosure that may be suitable for use to practice selected aspects of the present disclosure, according to various embodiments.

Referring now to FIG. 5, which illustrates an example computing device 500 that may include an example primary device and an example secondary device configured to transmit or receive a notification of a crash event via a VW over an eSPI data bus, in accordance with various embodiments. For example, computing device 500 may include a host CPU or processor(s) 502 that may include, e.g., host CPU 103 shown in FIGS. 1 and 2. For the purpose of this application, including the claims, the terms "processor" and "processor cores" may be considered synonymous, unless the context clearly requires otherwise. The processor 502 may include any type of processors and may be implemented as an integrated circuit having multi-cores, e.g., a multi-core microprocessor.

In embodiments, processor 502 is coupled to a primary device 505 and a secondary device 507 that may be, e.g., similar to or same as primary device 105 and secondary device 107 as discussed in connection with FIGS. 1 and 2. In embodiments, primary device 505 includes a platform controller interface device, such as a companion chipset to processor 502, e.g., PCH, coupled to secondary device 507. In various embodiments secondary device 507 may be an EC, SIO, baseboard management controller or other suitable eSPI secondary device including a channel interface (e.g., eSPI channel interfaces 123 of FIG. 1) to couple to an eSPI data bus to link to primary device 505. In embodiments, example primary device 505 includes an eSPI device controller including logic to transmit the notification of the crash event via a VW over the data bus. In embodiments, the eSPI primary device transmits notification of the crash event without allocation of a dedicated wire signal for the notification between the eSPI primary device and the eSPI secondary device. In embodiments, the eSPI device controller and eSPI channel interfaces of the present disclosure, for example, are implemented as hardware, firmware, software, or some combination thereof.

The computing device 500 may include system memory 504 and persistent storage devices 506 (such as diskette, hard drive, volatile memory (e.g., dynamic random-access memory (DRAM), compact disc read-only memory (CD-ROM), digital versatile disk (DVD), and so forth). In general, system memory 504 and/or persistent storage devices 506 may be temporal and/or persistent storage of any type, including, but not limited to, volatile and non-volatile memory, optical, magnetic, and/or solid state mass storage, and so forth. In embodiments, persistent storage devices 506 includes one or more of, e.g., flash 109 or 111 of FIG. 1. Volatile memory may include, but is not limited to, static and/or dynamic random-access memory. Non-volatile memory may include, but is not limited to, electrically erasable programmable read-only memory, phase change memory, resistive memory, and so forth.

In embodiments, ROM 503 may include BIOS 599 (e.g., to assist in performing operations as discussed in connection with host CPU 103 of FIGS. 1 and 2). In embodiments, ROM 503 and BIOS 599 may be any one of a number of ROM and BIOS known in the art. In other embodiments, BIOS 599 may be included in a flash device (not shown).

The computing device 500 may further include input/output (I/O) interface 508 to receive one or more I/O devices (such as a display (e.g., a touchscreen display), keyboard, cursor control, remote control, gaming controller, image capture device, and so forth) and communication interfaces 510 (such as network interface cards, modems, infrared receivers, radio receivers (e.g., Bluetooth), and so forth). The communication interfaces 510 may include communication chips (not shown) that may be configured to operate the device 500 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 510 may operate in accordance with other wireless protocols in other embodiments.

The above-described computing device 500 elements may be coupled to each other via system bus 512, which may represent one or more buses. In the case of multiple buses, they may be bridged by one or more bus bridges (not shown). Each of these elements may perform its conventional functions known in the art. One or more buses may include an eSPI data bus, e.g., to allow an eSPI primary device or eSPI secondary device to transmit or receive a notification of a CATERR or other crash event without allocation of a dedicated wire signal between the eSPI primary device and eSPI secondary device for the notification. In embodiments, the packet-based signaling comprises a VW, such as a VW 117 of FIG. 1. Note that system memory 504 and mass storage devices 506 may be employed to store a working copy and a permanent copy of the programming instructions for implementing the operations of an operating system or one or more applications, collectively referred to as computational logic 522. The various elements may be implemented by assembler instructions supported by processor(s) 502 or high-level languages that may be compiled into such instructions.

The permanent copy of the programming instructions may be placed into mass storage devices 506 in the factory, or in the field, through, for example, a distribution medium (not shown), such as a compact disc (CD), or through communication interface 510 (from a distribution server (not shown)). That is, one or more distribution media having an implementation of the agent program may be employed to distribute the agent and to program various computing devices.

The number, capability, and/or capacity of the elements 508, 510, 512 may vary, depending on whether computing device 500 is used as a stationary computing device, such as a set-top box or desktop computer, or a mobile computing device, such as a tablet computing device, laptop computer, game console, or smartphone. Their constitutions are otherwise known, and accordingly will not be further described.

For one embodiment, at least one of processors 502 may be packaged together with computational logic 522 to form a System in Package (SiP) or a System on Chip (SoC). For example, in embodiments, an SoC may include an eSPI channel interface to transmit a VW notification of a crash event to a secondary device in embodiments similar to those discussed in connection with FIGS. 1-4.

In various implementations, the computing device 500 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 600 may be any other electronic device that processes data.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Figure 6:
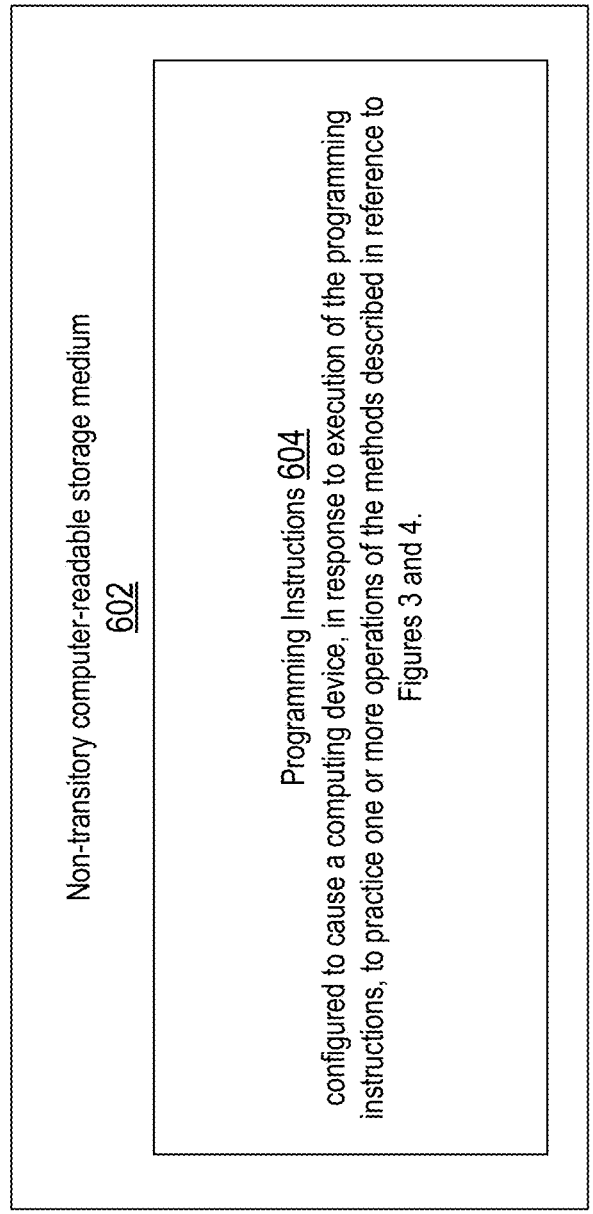
FIG. 6 illustrates a storage medium having instructions for practicing methods described with references to FIGS. 1-4, according to various embodiments.

FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., a microcontroller or programmable circuit within or coupled to primary device 505 (e.g., an eSPI secondary device controller) or secondary device 507, in response to execution of the programming instructions, to implement (aspects of) and including logic to transmit the notification of the crash event such as a CATERR via a VW over an eSPI data bus. In alternate embodiments, programming instructions 604 may be disposed on multiple computer-readable non-transitory storage media 602 instead. In still other embodiments, programming instructions 504 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is an apparatus, comprising an Enhanced Serial Peripheral Interface (eSPI) channel interface to couple to a data bus to link an eSPI primary device to an eSPI secondary device; and an eSPI device controller coupled to the channel interface and including logic to transmit or receive a notification of a crash event via packet-based signaling over the data bus, to allow the eSPI primary device or the eSPI secondary device to transmit or receive the notification of the crash event without allocation of a dedicated wire signal for the notification between the eSPI primary device and the eSPI secondary device.

Example 2 is the apparatus of Example 1, wherein the apparatus is an eSPI primary device and the packet-based signaling comprises a Virtual Wire (VW) to transmit the notification of the crash event to the eSPI secondary device over an eSPI data bus.

Example 3 is the apparatus of Example 2, wherein the crash event includes a catastrophic error (CATERR) associated with a host central processing unit (CPU coupled to the eSPI primary device or a CATERR associated with the eSPI primary device.

Example 4 is the apparatus of Example 3, wherein the eSPI primary device comprises a platform controller interface device to control communications between the eSPI secondary device and a host CPU coupled to the eSPI primary device.

Example 5 is the apparatus of Example 4, wherein the platform controller interface device comprises a platform controller hub (PCH).

Example 6 is the apparatus of Example 2, wherein the eSPI primary device further comprises a power management controller (PMC) to detect and store a crash log report of the crash event.

Example 7 is the apparatus of Example 6, wherein the PMC is to, in response to a request from the eSPI secondary device, retrieve the crash log report from a memory and provide the crash log report via an out of band message to the eSPI secondary device.

Example 8 is the apparatus of any one of Examples 1-7, wherein after the crash log report is provided to the eSPI secondary device, the eSPI primary device is to implement a reset command to recover a previous state of the CPU.

Example 9 is the apparatus of Example 1, wherein the apparatus is an eSPI primary device and the eSPI device controller to include logic to notify an eSPI secondary device including one or more of an embedded controller (EC), baseboard management controller (BMC), or super input/output (SIO) controller, of the crash event.

Example 10 is a method, comprising: detecting, by an eSPI primary device, a crash event; and transmitting, by the eSPI primary device, notification of the crash event via packet-based signaling over a data bus, to allow the eSPI primary device to communicate the crash event to an eSPI secondary device without allocation of a dedicated wire signal for the notification between the eSPI primary device and the eSPI secondary device.

Example 11 is the method of Example 10, wherein transmitting, by the eSPI primary device, notification of the crash event via packet-based signaling comprises transmitting the notification via a Virtual Wire (VW)

Example 12 is the method of Example 11, further comprising collecting by the eSPI primary device, crash log data related to the crash event from a CPU or a device associated with the eSPI primary device and storing the crash log data in a memory associated with a power management controller (PMC) of the eSPI primary device.

Example 13 is the method of Example 11, further comprising, after transmitting, by the eSPI primary device, notification of the crash event: receiving, by the eSPI primary device, a request for the crash log data from the eSPI secondary device; and providing, by the eSPI primary device, the crash log data to the eSPI secondary device, prior to a reset of the eSPI primary device.

Example 14 is the method of Example 11, wherein transmitting, by the eSPI primary device, notification of the crash event comprises transmitting a notification of a catastrophic error (CATERR) to an embedded controller, prior to a reset of a CPU coupled to the eSPI primary device or a reset of the eSPI primary device.

Example 15 is the method of any one of Examples 10-14, wherein transmitting, by the eSPI primary device, notification of the CATERR comprises transmitting the notification via the VW to an eSPI secondary device including one or more of an embedded controller (EC), baseboard management controller (BMC), or super input/output (SIO) controller.

Example 16 includes an apparatus comprising means for performing any one of the methods of Examples 10-15 or other example herein.

Example 17 is a system, comprising: a central processing unit (CPU); and a primary eSPI device coupled to the CPU, wherein the primary eSPI device comprises: an eSPI channel interface to couple to a data bus to link the eSPI primary device to an eSPI secondary device; and an eSPI device controller coupled to the channel interface and including logic to transmit or receive a notification of a crash event via packet-based signaling over the data bus, to allow the eSPI primary device or the eSPI secondary device to transmit or receive the notification of the crash event without allocation of a dedicated wire signal between the eSPI primary device and the eSPI secondary device for the notification.

Example 18 is the system of Example 17, wherein the primary eSPI device includes a platform controller interface device and is further coupled to one or more eSPI secondary devices including one or more of an embedded controller (EC), baseboard management controller (BMC), or super input/output (SIO) controller.

Example 19 is the system of Example 18, wherein the packet-based signaling comprises a Virtual Wire (VW) to transmit the notification of the crash event to the eSPI secondary device over an eSPI data bus.

Example 20 is the system of Example 18, wherein the system further comprises the eSPI secondary device and the eSPI secondary device includes an embedded controller (EC).

Example 21 is the system of any one of Examples 17-20, wherein the crash event is a catastrophic error (CATERR) associated with the CPU.

Example 22 is an Enhanced Serial Peripheral Interface (eSPI) primary device, comprising: a channel interface to couple to a data bus to link the eSPI primary device to an eSPI secondary device; and an eSPI device controller coupled to the channel interface and including logic to notify the eSPI secondary device of a crash event via packet-based signaling over the data bus, to allow the eSPI primary device to communicate the crash event to the eSPI secondary device without allocation of a dedicated wire signal over the data bus for the notification between the eSPI primary device and the eSPI secondary device.

Example 23 is the eSPI primary device of Example 22, wherein the packet-based signaling comprises a Virtual Wire over an eSPI data bus and the crash event includes a catastrophic error (CATERR) associated with a host CPU coupled to the eSPI primary device or a CATERR associated with the eSPI primary device.

Example 24 is the eSPI primary device of Example 22, wherein the eSPI primary device comprises a platform controller interface device to control communications between the eSPI secondary device and a host CPU coupled to the eSPI primary device.

Example 25 is the eSPI primary device of Example 24, wherein the platform controller interface device is a platform controller hub (PCH).

Example 26 is the eSPI primary device of any one of Examples 22-26, wherein the eSPI primary device further includes a power management controller (PMC) to detect and store a crash log report.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus, comprising:
   an Enhanced Serial Peripheral Interface (eSPI) channel interface to couple to a data bus to link an eSPI primary device to an eSPI secondary device; and
   an eSPI device controller coupled to the channel interface and including logic to transmit or receive a notification of a crash event via a virtual wire (VW), using packet-based signaling over the data bus, to allow the eSPI primary device or the eSPI secondary device to transmit or receive the notification of the crash event without allocation of a dedicated wire signal between the eSPI primary device and the eSPI secondary device for the notification, wherein the logic further causes the eSPI device controller to, after the eSPI primary device transmits notification of the crash event and in response to a request for crash log data, provide the crash log data to the eSPI secondary device prior to a reset of the eSPI primary device.

2. The apparatus of claim 1, wherein the apparatus is an eSPI primary device and the VW is to transmit the notification of the crash event to the eSPI secondary device over an eSPI data bus.

3. The apparatus of claim 2, wherein the crash event includes a catastrophic error (CATERR) associated with a host central processing unit (CPU) coupled to the eSPI primary device or a CATERR associated with the eSPI primary device.

4. The apparatus of claim 3, wherein the eSPI primary device comprises a platform controller interface device to control communications between the eSPI secondary device and the host CPU coupled to the eSPI primary device.

5. The apparatus of claim 4, wherein the platform controller interface device comprises a platform controller hub (PCH).

6. The apparatus of claim 2, wherein the eSPI primary device further comprises a power management controller (PMC) to detect the crash event and store crash log data of the crash event in a crash log report.

7. The apparatus of claim 6, wherein the PMC is to, in response to the request for crash log data from the eSPI secondary device, retrieve the crash log report from a memory and provide the crash log report via an out of band message to the eSPI secondary device.

8. The apparatus of claim 7, wherein after the crash log report is provided to the eSPI secondary device, the eSPI primary device is to implement a reset command to recover a previous state of the CPU.

9. The apparatus of claim 1, wherein the apparatus is an eSPI primary device and the eSPI device controller is to include logic to notify an eSPI secondary device including one or more of an embedded controller (EC), baseboard management controller (BMC), or super input/output (SIO) controller, of the crash event.

10. A method, comprising:
    detecting, by an eSPI primary device, a crash event; and
    transmitting, by the eSPI primary device, notification of the crash event via packet-based signaling via a Virtual Wire (VW) over a data bus, to allow the eSPI primary device to communicate the crash event to an eSPI secondary device without allocation of a dedicated wire signal for the notification between the eSPI primary device and the eSPI secondary device;
    receiving, by the eSPI primary device, a request for crash log data from the eSPI secondary device; and
    providing, by the eSPI primary device, the crash log data to the eSPI secondary device, prior to a reset of the eSPI primary device.

11. The method of claim 10, further comprising collecting by the eSPI primary device crash log data related to the crash event from a CPU or a device associated with the eSPI master device and storing the crash log data in a memory of the eSPI primary device.

12. The method of claim 10, wherein transmitting, by the eSPI primary device, notification of the crash event comprises transmitting a notification of a catastrophic error (CATERR) to an embedded controller, prior to the reset of a CPU coupled to the eSPI primary device or a reset of the eSPI primary device.

13. The method of claim 12, wherein transmitting, by the eSPI primary device, notification of the CATERR comprises transmitting the notification via the VW to an eSPI secondary device including one or more of an embedded controller (EC), baseboard management controller (BMC), or super input/output (SIO) controller.

14. A system, comprising:
a central processing unit (CPU); and
a primary eSPI device coupled to the CPU, wherein the primary eSPI device comprises:
an eSPI channel interface to couple to a data bus to link the eSPI primary device to an eSPI secondary device; and
an eSPI device controller coupled to the channel interface and including logic to transmit or receive a notification of a crash event via a virtual wire (VW) including packet-based signaling over the data bus, to allow the eSPI primary device or the eSPI secondary device to transmit or receive the notification of the crash event without allocation of a dedicated wire signal between the eSPI primary device and the eSPI secondary device for the notification, wherein the logic is to further cause the controller to, after the eSPI primary device transmits notification of the crash event and in response to a request for crash log data, provide the crash log data to the eSPI secondary device prior to a reset of the eSPI primary device.

15. The system of claim 14, wherein the primary eSPI device includes a platform controller interface device and is further coupled to one or more eSPI secondary devices including one or more of an embedded controller (EC), baseboard management controller (BMC), or super input/output (SIO) controller.

16. The system of claim 15, wherein the packet-based signaling transmits the notification of the crash event to the eSPI secondary device over an eSPI data bus.

17. The system of claim 15, wherein the system further comprises the eSPI secondary device and the eSPI secondary device includes an embedded controller (EC).

18. The system of claim 17, wherein the crash event is a catastrophic error (CATERR) associated with the CPU.

* * * * *